Feb. 7, 1961   M. R. SOMMERIA   2,971,079
SEAM TRACKING TRANSDUCER
Filed Feb. 12, 1959   2 Sheets-Sheet 2

INVENTOR.
Marcel R. Sommeria
BY Mueller & Aichele
Attys.

United States Patent Office 2,971,079
Patented Feb. 7, 1961

2,971,079

SEAM TRACKING TRANSDUCER

Marcel R. Sommeria, Palos Heights, Ill., assignor to Welding Research, Inc., Chicago, Ill., a corporation of Illinois Filed Feb. 12, 1959, Ser. No. 792,914

20 Claims. (Cl. 219—125)

This invention relates generally to positoning control systems and more particularly to a system for guiding a tool along a workpiece and/or spacing the same from the workpiece.

There are many applications in which it is desired to automatically control the position of a tool which is performing some operation on a workpiece. For example, in welding it may be desired to automatically hold a welding element along a seam on parts to be welded to track the seam as the parts move. Or, it may be desired to hold the welding element at a proper spacing with respect to a part being welded. Although automatic tracking and positioning systems have been provided these have been quite complex and have not been entirely effective to hold the welding element or other tool in the proper position.

It is therefore an object of the invention to provide an improved system for automatically positioning a tool with respect to a workpiece.

A further object of the invention is to provide a positioning system which automatically follows an irregularity, such as a seam or a projection, in a structure upon which some operation is to be performed.

Another object of the invention is to provide an improved electrical control system which responds to the electrical field produced in a workpiece to provide a control signal which may be used to hold a tool in a desired operating position with respect to the workpiece.

A feature of the invention is the provision of an electrical control system including a high frequency oscillator with a pickup coil coupled thereto and adapted to be positioned adjacent a conductive structure, with the structure producing a field which affects the voltage across the pickup coil and this voltage controls the position of a tool with respect to the conducting structure.

A further feature of the invention is the provision of a control system as defined in the preceding paragraph wherein the high frequency signals are applied in balanced relation to a pair of pickup coils having cores positioned to track an irregularity in a workpiece, and with the voltage across the coils being rectified to provide a balanced output voltage varying about zero and having a polarity which indicates the required direction of movement. Alternatively a single coil may be provided on a balanced core structure to provide a signal the phase of which indicates the desired direction of movement.

Another feature of the invention is the provision of an automatic electrical positioning system wherein oscillations are applied to a pickup coil adjacent a conducting workpiece and the voltage thereacross is affected by the position of the workpiece, with this voltage being compared to a reference voltage to provide a control voltage for automatically holding the spacing of the tool from the workpiece. The tracking and spacing systems may be utilizing a voltage developed for tracking control and comparing this voltage with a fixed voltage for spacing control.

Still another feature is the provision of a pickup assembly having spaced pole tips for indicating the position of the tips from a conducting surface or irregularity which controls a servo for moving the pickup assembly and an operating element, with the servo providing either linear or pivotal movement to provide the desired position of the operating element.

A still further feature of the invention is the provision of an improved pickup assembly including a core structure for the pickup coil having a conducting foil about a core portion to channel the flux through the core and thence through the coil, and having another core portion providing a return path about the coil. This pickup coil structure can be provided in a conducting housing and the housing does not substantially affect the flux path through the coil to reduce the sensitivity of the system.

The invention is illustrated in the accompanying drawings wherein.

In practicing the invention there is provided an automatic positioning system utilizing high frequency oscillations to provide a control effect. A high frequency oscillator has an output coil coupled to a pair of coils which are in turn connected to pickup coils. The pickup coils are positioned on cores and provided in a unit so that the tips of the cores are adjacent a conducting workpiece. The core tips may be spaced to be positioned along a seam to be welded, with the welding element being supported for movement with the pickup coils. The conducting workpiece will provide a field which affects the flux through the cores to vary the high frequency voltage across the coils. The voltages will vary with the configuration of the workpiece and its position with respect to the core tips, and in the example given with the position of the core tips relative to the seam. The voltages across the coils are rectified to provide a direct current control voltage which varies in amplitude and polarity with the extent and sense of the position of the core tips to the seam. This voltage is used to control a tracking servo which energizes a motor to move the pickup unit to follow the seam.

The system may also be used to control a pivotally mounted system to hold an element in a desired angular relation to a workpiece as perpendicular thereto. The system may be used to provide a spacing control by averaging the voltages in the two coils for providing tracking, and comparing the average with a fixed voltage to control another servo. The pickup units may include coils with a magnetic structure for carefully channeling the flux through the coils so that the coils are sensitive to the field developed in the workpiece. Instead of providing a pair of coils, a balanced magnetic structure may be used with a single coil in the voltage across which will vary in phase with changes in the flux pattern at two spaced pole tips. This voltage may be app'ied to a phase detector for providing a control voltage varying in amplitude and polarity with the position of the pickup unit with respect to a workpiece.

Figure 1:
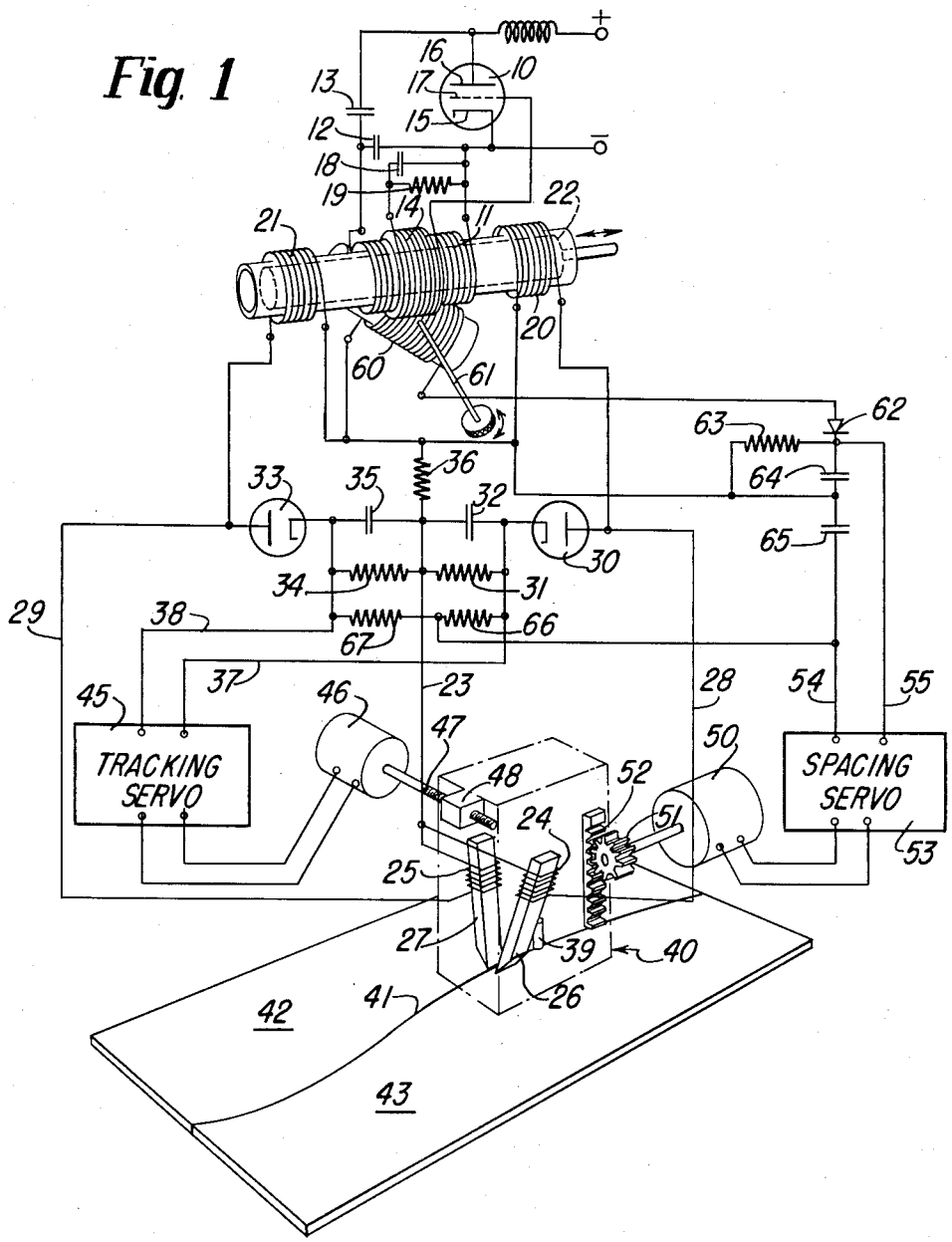
Fig. 1 is a schematic diagram illustrating the system in accordance with the invention.

Reference is now made to Fig. 1 which illustrates the positioning system of the invention. An oscillator is provided which may be of any known type and is illustrated as including a triode tube 10 having a tuned circuit including output coil 11 and capacitor 12. The tuned circuit is connected to the cathode 15 of the triode, and through capacitor 13 to the plate 16 thereof. A feedback coil 14 is provided about the output coil 11 and is coupled to the grid 17 of the tube 10, and through the bias circuit including parallel connected condenser 18 and resistor 19 to the cathode 15 thereof. The circuit described provides high frequency oscillations in the output coil 11.

Coupled to the oscillator output coil are two coils 20 and 21. The coils 20 and 21 may be on the same form as the output coil 11 and a movable core 22 may be provided therein. Movement of the core axially within the form changes the coupling between the output coil 11 and the pickup coils 20 and 21, and may be used to balance the signals in the coils 20 and 21 as will be further described. The coils 20 and 21 are connected through conductors 23, 28 and 29 to pickup coils 24 and 25 respectively, which are provided on cores 26 and 27 respectively. The detailed construction of the coils and cores will be further described. The connection of the two transducer coils to the pickup coils may have one common lead 23 which extends from resistor 36. The resistor 36 is required to render the system more sensitive.

High frequency current is fed to the pickup coils 24 and 25 and the voltage developed thereacross will be affected by conductive material in the vicinity of the tips of the cores therein. The conducting material in effect provides a short circuited turn which produces a magnetic field. This field will affect the field through the cores so that the voltages across the coils will vary. The voltages across the coils may therefore be used to indicate the position of the cores with respect to a conducting structure.

For deriving an indication from the coil 24 a rectifier 30 and a load circuit including resistor 31 and capacitor 32 are connected thereacross. Similarly connected across the pickup coil 25 is a rectifier 33 connected in series with the load circuit including resistor 34 and capacitor 35. The conductors 37 and 38 therefore have developed thereacross a direct current potential which is a measure of the voltage of the high frequency current in the coils 24 and 25. The potential between these leads will be zero when the potentials in the two coils are the same since in such case the voltage across capacitor 32 will be the same as that across capacitor 35. Since both voltages are developed with respect to a single reference point, there will be no voltage difference between the two conductors. However, if the voltage in coil 24 is greater than the voltage in coil 25, then the rectified voltage across capacitor 32 will be greater than that across capacitor 35 and a voltage difference will exist between conductors 37 and 38. It will be apparent that this difference in potential will be of opposite polarity when the voltage developed in coil 25 is greater than that in coil 24.

The system so far described can be used to track the position of a welding element 39, which is mounted with the pickup coils 24 and 25 as a unit generally designated 40. The system may be used to track the unit with respect to a seam 41 between two elements 42 and 43 which are to be welded. It will be apparent that if the seam 41 is moved toward the core 26 the short circuiting effect in the material under the core is reduced and the flux developed in the workpiece will have less effect on the voltage in coil 24. The short circuiting effect in the material under core 27 will at the same time be increased so that a field is developed which will oppose the voltage in the coil 25 so that this voltage will reduce. Accordingly movement of the seam in this direction will increase the voltage in coil 24 and reduce the voltage in coil 25. As previously stated, this will provide a rectified voltage between points 37 and 38. The voltage between conductors 37 and 38 may be applied to a servo system 45 which provides an energizing voltage for motor 46. Motor 46 may drive a screw 47 which is threaded in a nut 48 fastened to the unit 40. Accordingly as the screw 47 turns the unit 48 will be moved transversely with respect to the seam 41, and by proper action of the servo the unit 40 can be held at a desired position with respect to the seam through action of the control circuit which has been described.

As previously stated, the core 22 is movable within the coil form on which coils 11, 20 and 21 are provided to change the voltage produced in the coils 20 and 21 from the oscillator output coil 11. This can be used to balance the system so that when the welding element is properly positioned to the seam the voltage between conductors 37 and 38 is zero. The tracking servo will therefore not energize the motor 46 and the unit 40 will remain in fixed position.

The tracking system may also be used to position the welding element 39 provided in the unit 40 at the proper distance with respect to the part to be welded. The spacing of the unit 40 from the part 42, 43 is controlled by the motor 50 which drives gear 51 in engagement with rack 52 provided on the unit 40. The motor 50 is controlled by a servo 53 which may be of any standard construction and may be similar to the servo 45. Servo 53 is controlled by the voltage applied to leads 54 and 55. For energizing the leads 54 and 55 a first reference voltage is provided from a pickup coil 60 which is coupled to the oscillator output coil 11. This coil is provided on a pivot 61 and may be rotated with respect to the output coil to control the coupling therewith. The coil 60 is connected in series with rectifier 62 to a load circuit including resistor 63 and capacitor 64. Accordingly a voltage will be developed across capacitor 64 depending upon the output of the oscillator coil 11 and the position of the coil 60 with respect thereto.

A capacitor 65 is connected through resistors 66 and 67 to the load circuits connected to the pickup coils 24 and 25 and averages the voltages produced in the two pickup coils. Accordingly as the voltages across condensers 32 and 35 decrease or increase, as the unit 40 is moved toward or away from the part being welded, the average of the two voltages appears across capacitor 65. The average is taken so that the effect resulting from the transverse position of the unit with respect to the seam is removed. This average voltage across capacitor 65 is balanced against the fixed voltage across capacitor 64 and provides the output voltage between conductors 54 and 55.

The coil 60 can be positioned by rotation thereof about its pivot so that when the unit 40 is at the proper spacing with respect to the part being welded, the voltage across capacitor 64 and 65 will be equal. Accordingly no voltage will be applied to the spacing servo and the motor 50 will not be energized. However, when the unit 40 moves so that its spacing from the part being welded changes, the voltage across condenser 65 will change and the voltage between conductors 54 and 55 will change. This will cause energization of the motor 50 to drive the gear 51 to move the unit 40 with respect to the part being welded. It will be obvious that as the unit 40 moves so that the spacing will increase or decrease, the voltage across capacitor 65 will be larger or smaller than that across capacitor 64. The polarity of the voltage between conductors 54 and 55 will change as the spacing is greater or less than the desired spacing so that the servo will provide the proper direction of rotation of the motor 50 to correct for the spacing of the unit 40 which carries the welding element 39.

Figure 2:
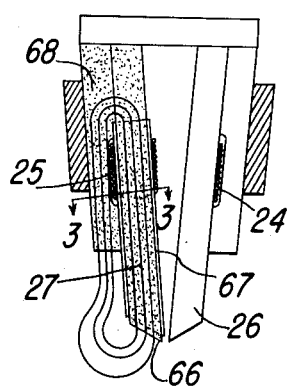
Figs. 2 and 3 show the structure of the pickup unit.
Figure 3:
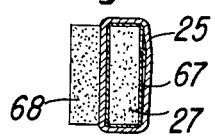

Figs. 2 and 3 show the construction of the pickup unit which provides highly satisfactory operation. The coils 24 and 25 are mounted on cores 26 and 27 respectively which may be made of ferrite material. Extending from the tip 66 of each core to a position above the coil is a layer of conducting foil 67. The foil may completely circle the core and overlap, but the overlapping portions are insulated from each other so that the core is not short circuited. The foil channels the flux from the tips of the core up through the coil, but does not reduce the permeability of the core by forming a short circuited turn. A second core member 68 is placed adjacent the core 27 to provide a return path about the coil 25. This makes it possible to house the pickup coils and cores in a conducting casing without altering the magnetic effect thereof. This provides a very sensitive pickup unit, with the flux path through the coil 25 extending through the main core 27, being channeled within the conducting foil 67 there around, and a return path being provided through the ferrite member 68, as shown in Fig. 2.

Figure 4:
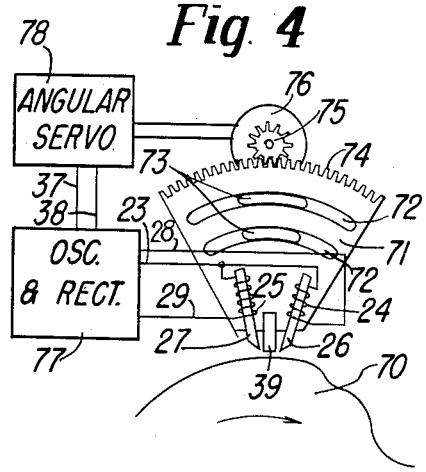
Fig. 4 illustrates a system for controlling the angular position of an element.

The system as described may also be used to control the angular position of an element operating on a workpiece, such as a welding torch, with respect to an irregular workpiece. The use of the system in this way is illustrated in Fig. 4. In this figure an irregular workpiece 70 may be moved with respect to an element 39, and it is desired that the element 39 remain perpendicular to the surface of the workpiece. The element 39 is mounted on a support plate 71 having slots 72 therein to receive track 73 which supports the member. The slots and tracks are shaped so that the member 71 may be pivotally moved about an axis at the tip of the element 39. Movement of the support plate 71 is provided by the gear 75 operating in teeth 74 at the upper edge of the plate 71, with the gear 75 being driven by a motor 76.

Coils 24 and 25 provided on cores 26 and 27 as described above are secured to plate 71. The tips of the cores 26 and 27 may be spaced on either side of the element 39. It is therefore apparent that when the element 39 is pivoted with respect to the tangent of the surface of the piece 70, the spacing of the tips of the cores 26 and 27 from the workpiece will change. When the element 39 is perpendicular to the surface, the spacing of the tips will be the same. The coils 24 and 25 are connected to conductors 23, 28 and 29 as in Fig. 1 so that oscillations are applied thereto from the oscillator and rectifier system 77, and the voltages developed thereacross are rectified to provide balanced voltages on the conductors 37 and 38. This oscillator and rectifier system may be exactly as illustrated in Fig. 1. The conductors 37 and 38 are connected to angular servo 78 which applies energizing current for motor 76 to properly position the supporting plate 71. The servo system may therefore operate to hold the element 39 perpendicular to workpiece 70.

It will be apparent that the oscillator and rectifier system 77 may also provide a voltage for controlling the spacing of the element 39 with respect to workpiece 70 as in the system of Fig. 1. Accordingly this further control can be combined with the angular control illustrated in Fig. 4.

Figure 5:
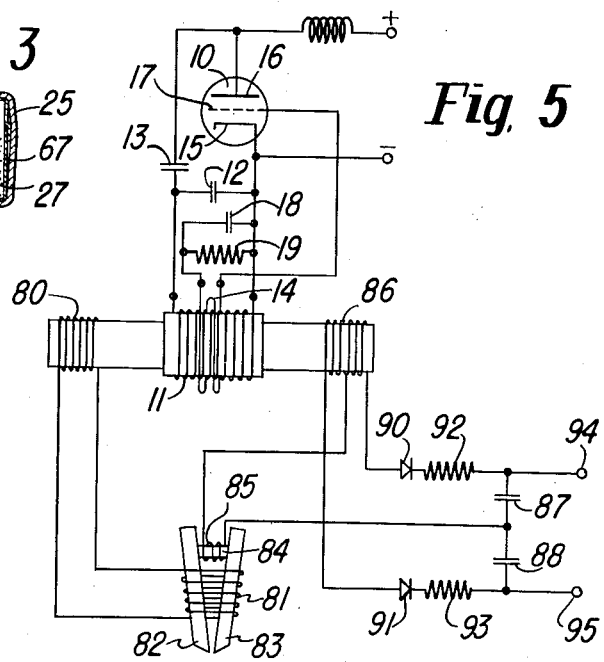
Fig. 5 is a schematic diagram of a modification of the system.

In Fig. 5 there is shown a modification of the system in which the response in a single pickup coil is used. The oscillator may be identical to that of Fig. 1 and the same reference numerals are applied as in Fig. 1. The output coil 11 of the oscillator is inductively coupled to a coil 80 which applies oscillations to coil 81 in the pickup unit. The coil 81 extends completely around the magnetic structure which includes two spaced pole plates 82 and 83 which may be positioned with respect to a seam or other irregularity to be tracked. The magnetic structure includes a bridge arm 84 interconnecting the pole plates 82 and 83 about which a pickup coil 85 is placed.

The voltage developed across the pickup coil 85 is applied to a phase detector to which reference signals from the oscillator are also applied. The reference signals are provided by coil 86, coupled to the oscillator output coil 11, which has two balanced portions and a center tap. The pickup coil 85 is connected to the center tap of coil 86 and to the junction between capacitors 87 and 88. The end terminals of the coil 86 are connected through rectifiers 90 and 91 which are in series with resistors 92 and 93 respectively to the other terminals of capacitors 87 and 88. This forms a known phase detector circuit which provides a direct current voltage across terminals 94 and 95 which will vary in opposite polarities from zero depending upon the phase of the signal in coil 85. It will be apparent that the phase of this signal will depend upon the flux in the workpiece adjacent the core plates 82 and 83 which affects the voltage developed in coil 85. The output voltage of the phase detector at terminals 94 and 95 will indicate the position of the pickup unit with respect to the irregularities being tracked.

The system of Fig. 5 can also be used to provide a distance indication as the voltage across the coil 81 will vary with the spacing of the core plates 82 and 83 from the workpiece. Accordingly this voltage can be compared with a fixed voltage to provide an indication of the spacing a manner generally similar to that illustrated in Fig. 1. The system of Fig. 5 may also be used to control the angular position of an element as illustrated in Fig. 4.

Although the positioning system has been described for positioning a welding element with reference to a workpiece, it will be obvious that the system can be used to move any other tool or element of any type which is to be maintained in a predetermined position with respect to a conducting structure which has irregularities to be followed. The system will follow a projection of a recess as well as a seam as has been described. The unit is quite sensitive and can follow and irregularity which might be on the under side of a plate or in a second plate which is underneath a first uniform plate. The system may control the angular position of any tool or operating element. The spacing control system can be used to space any desired element with respect to an object which is conductive.

The system provides accurate control which is responsive to the sense of the position as well as to the distance. Various known servo systems can be used to translate the control voltages into movement. The control voltages follow the position instantaneously and the speed of the control will be as fast as the servo system which is utilized therewith.

I claim:

1. Apparatus responsive to the position of an element with respect to a conducting structure including in combination, oscillator means for producing high frequency electrical oscillations, coil means in fixed position with the element and adjacent the conducting structure, means coupling said coil means to said oscillator means to provide oscillations in said coil means forming a field adjacent said conducting structure, said coil means including a coil portion in which a high frequency signal is developed which is affected by the field developed in the conducting structure and which varies with the relative position of said coil means with respect to the conducting structure, and a detector circuit coupled to said coil portion and responsive to the high frequency signal therein, said detector circuit producing a direct current control voltage varying in polarity and in magnitude from zero in accordance with the position of said coil means with respect to said conducting structure.

2. Apparatus for positioning an element with respect to a conducting structure wherein the element performs an operation on the structure and there is relative movement between the element and the structure, said apparatus including in combination, oscillator means for producing high frequency electrical oscillations, coil means in fixed position with the element and adjacent the conducting structure, means coupling said coil means to said oscillator means to provide oscillations in said coil means forming a field adjacent said conducting structure, said coil means including a coil portion in which a high frequency signal is developed which is affected by the field developed in the conducting structure and which varies with the relative position of said coil means with respect to the conducting structure, and a detector circuit coupled to said coil portion and responsive to the high frequency signal therein, said detector circuit producing a direct current control voltage varying in polarity and in magnitude from zero in accordance with the position of said coil means with respect to said conducting structure, and means responsive to said direct current control voltage for controlling the position of the element during relative movement between the element and the conducting structure.

3. Apparatus responsive to the position of an element with respect to a conducting structure including in combination, oscillator means for producing high frequency electrical oscillations, coil means in fixed position with the element and adjacent to the conducting structure, means coupling said coil means to said oscillator means to provide oscillations in said coil means forming a field adjacent said conducting structure, said coil means including a coil portion in which a high frequency signal is developed which is affected by the field developed in the conducting structure and which varies with the spacing of said coil means from the conducting structure, and a detector circuit coupled to said coil portion and responsive to the high frequency signal therein, said detector circuit producing a direct current control voltage varying in polarity and in magnitude from zero in acordance with the spacing of said coil means from said conducting structure.

4. Apparatus responsive to the position of an element with respect to an irregularity in a conducting structure including in combination, oscillator means for producing high frequency electrical oscillations, coil means in fixed position with the element and adjacent to the conducting structure, means coupling said coil means to said oscillator means to provide oscillations in said coil means forming a field adjacent said conducting structure, said coil means including a coil portion in which a high frequency signal is developed which is affected by the field developed in the conducting structure adjacent the irregularity therein and which varies with the relative position of said coil means with respect to the irregularity, and a detector circuit coupled to said coil portion and responsive to the high frequency signal therein, said detector circuit producing a control voltage varying in polarity and in magnitude from zero in accordance with the position of said coil means with respect to said conducting structure.

5. Apparatus responsive to the position of an element with respect to an irregularity in a conducting structure including in combination, means for producing high frequency electrical oscillations, first and second transducer coils coupled to said means and having oscillations induced therein, first and second pickup coils in fixed position with respect to the element and adjacent the conducting structure, said pickup coils being individually coupled to said transducer coils, the oscillations in said pickup coils producing a field about the conducting structure which varies with the position of the pickup coils with respect to the irregularity to cause the high frequency voltage across said pickup coils to vary, rectifier circuits individually coupled across said pickup coils for producing direct current voltages which vary with respect to each other because of the variation in the high frequency voltages across said pickup coils, said rectifier circuits including load means, and means connecting said load means in opposing relation for producing an output voltage varying in polarity and in magnitude from zero in accordance with the position of said pickup coils with respect to the irregularity of the conducting structure.

6. Apparatus responsive to the position of an element with respect to a conducting structure having an irregularity therein including in combination, means for producing high frequency electrical oscillations, first and second coils coupled to said means and having oscillations induced therein, first and second pickup coil means in fixed position with respect to the element, said pickup coil means each having a coil and a core therein with a tip adjacent the conducting structure, means coupling said coils of said pickup coil means to said first and second coils respectively whereby oscillations in said pickup coils produce a field about the conducting structure which varies with the position of said core tips with respect to the conducting structure and causes the high frequency voltage across said pickup coils to vary, rectifier circuits individually coupled across said pickup coils for producing direct current voltages which vary with respect to each other because of the variation in the high frequency voltages across said pickup coils, said rectifier circuits including load means, and means connecting said load means in opposing relation for producing an output voltage varying in polarity and in magnitude from zero in accordance with the position of said pickup coils with respect to said conducting structure.

7. Apparatus for positioning an element with respect to an irregularity in a conducting structure wherein the element performs an operation on the structure and there is relative movement between the element and the structure, said apparatus including in combination, means for producing high frequency electrical oscillations, first and second transducer coils coupled to said means and having oscillations induced therein, first and second pickup coils in fixed position with respect to the element and adjacent the conducting structure, said pickup coils being individually coupled to said transducer coils, the oscillations in said pickup coils producing a field about the conducting structure which varies with the position of the pickup coils with respect to the irregularity to cause the high frequency voltage across said pickup coils to vary, rectifier circuits individually coupled across said pickup coils for producing direct current voltages which vary with respect to each other because of the variation in the high frequency voltages across said pickup coils, said rectifier circuits including load means, and means connecting said load means in opposing relation for producing an output voltage varying in polarity and in magnitude from zero in accordance with the position of said pickup coils with respect to said conducting structure, and means responsive to said direct current control voltage for controlling the position of the element during relative movement between the element and the conducting structure.

8. Apparatus for following an irregularity in a conducting structure including in combination, oscillator means for producing high frequency electrical oscillations, pickup means positioned adjacent the conducting structure including a magnetic structure having pole pieces with spaced pole tips adjacent the conducting structure and a magnetic bridge between said pole pieces, said pickup means including first coil means about both said pole pieces and coupled to said oscillator means to provide oscillations adjacent said conducting structure to produce a field therein, with the field varying with the position of said pole tips with respect to the irregularity, said pickup means including second coil means about said bridge and having a high frequency signal developed therein, said signal in said second coil means varying with the fields in said conducting structure adjacent said pole tips and thereby varying with the relative position of said pickup means with respect to the irregularity, a phase detector circuit coupled to said second coil means and to said oscillator means, said phase detector circuit producing a direct current control voltage varying in polarity and in magnitude from zero in accordance with the phase of said signal in said second coil means with respect to said oscillations.

9. Apparatus responsive to the position of an element with respect to a conducting structure wherein the element performs an operation on the structure and there is relative movement between the element and the structure, said apparatus including in combination, oscillator means for producing high frequency electrical oscillations, pickup means positioned adjacent the conducting structure including a magnetic structure having pole pieces with spaced pole tips adjacent the conducting structure and a magnetic bridge between said pole pieces, said pickup means including first coil means about both said pole pieces and coupled to said oscillator means to provide oscillations adjacent said conducting structure to produce a field therein, with the field varying with the position of said pole tips with respect to the structure, said pickup means including second coil means about said bridge and having a high frequency signal developed therein, said signal in said second coil means varying with the fields in said conducting structure adjacent said pole tips and thereby varying with the relative position of said pickup means with respect to the structure, a phase detector circuit coupled to said second coil means and to said oscillator means, said phase detector circuit producing a direct current control voltage varying in polarity and in magnitude from zero in accordance with the phase of said signal in said second coil means with respect to said oscillations, and means responsive to said direct current control voltage for controlling the position of the element during relative movement of the element and the conducting structure.

10. Apparatus responsive to the position of an element with respect to a conducting structure wherein the element performs an operation on the structure and there is relative movement between the element and the structure, said apparatus including in combination, oscillator means for producing high frequency electrical oscillations, coil means in fixed position with the element and including a pole piece adjacent the conducting structure, means coupling said coil means to said oscillator means to provide oscillations in said coil means forming a field adjacent said conducting structure, said coil means including a coil portion in which a high frequency signal is developed which is affected by the field developed in the conducting structure and which varies with the spacing of said pole piece with respect to the conducting structure, and a rectifier circuit coupled to said coil portion and comparing the rectified high frequency signal therein with a reference potential, said rectifier circuit producing a direct current control voltage varying in polarity and in magnitude from zero in accordance with the spacing of said coil means with respect to said conducting structure, and means responsive to said direct current control voltage for controlling the spacing of the element from the conducting structure during relative movement therebetween.

11. Apparatus responsive to the position of an element with respect to a conducting structure having an irregularity therein including in combination, means for producing high frequency electrical oscillations, first and second transducer coils coupled to said means and having oscillations induced therein, first and second pickup coils in fixed position with respect to the element and adjacent the conducting structure, said pickup coils being individually coupled to said transducer coils, the oscillations in said pickup coils producing a field about the conducting structure which varies with the position of the pickup coils with respect to the conducting structure to cause the high frequency voltage across said pickup coils to vary, rectifier circuits individually coupled across said pickup coils for producing direct current voltages which vary with respect to each other because of the variation in the high frequency voltages across said pickup coils, said rectifier circuits including load means, means connecting said load means in opposing relation for producing an output voltage varying in polarity and in magnitude from zero in accordance with the position of said pickup coils with respect to the irregularity in the conducting structure, circuit means connected to said load means providing a direct current voltage varying with the average of the voltages across said pickup coils, and means comparing said last mentioned direct current voltage with a reference voltage to provide a control voltage varying with the spacing of said pickup coils from the conducting structure.

12. Apparatus responsive to the position of an element with respect to an irregularity in a conducting structure including in combination, means for producing high frequency electrical oscillations, first and second coils coupled to said means and having oscillations induced therein, first and second pickup coils in fixed position with respect to the element and adjacent the conducting structure, said pickup coils being individually coupled to said transducer coils, the oscillations in said pickup coils producing a field about the conducting structure which varies with the position of the pickup coils with respect to the irregularity to cause the high frequency voltage across said pickup coils to vary, rectifier circuits individually coupled across said pickup coils for producing direct current voltages which vary with respect to each other because of the variation in the high frequency voltages across said pickup coils, said rectifier circuits including load means, means connecting said load means in opposing relation for producing an output voltage varying in polarity and in magnitude from zero in accordance with the position of said pickup coils with respect to the irregularity in the conducting structure, circuit means connected to said load means providing a direct current voltage varying with the average of the voltages across said pickup coils, means coupled to said oscillator means for providing a reference voltage and means comparing said last mentioned direct current voltage with said reference voltage to provide a control voltage varying with the spacing of said pickup coils from the conducting structure.

13. Apparatus responsive to the position of an element with respect to a conducting structure having an irregularity therein including in combination, means for producing high frequency electrical oscillations including output coil means, first and second transducer coils coupled to said output coil means and having oscillations induced therein, core means coupled to said output coil means and said first and second coils, first and second pickup coil means each having a coil individually coupled to one of said transducer coils and a core with a tip adjacent the conducting structure, said core tips being in fixed position with respect to the element, the oscillations in said pickup coils producing a field about the conducting structure which varies with the position of said core tips with respect to the conducting structure to cause the high frequency voltage across said pickup coils to vary, rectifier circuits individually coupled to said pickup coils, said rectifier circuits including load means for producing direct current voltages which vary with respect to each other because of the variation in the high frequency voltages across said pickup coils, means connecting said load means in opposing relation for producing an output voltage, said core means being movable with respect to said first and second transducer coils to control the signals in said pickup coils so that the direct current voltages in said load means vary in polarity and in magnitude from zero in accordance with the position of said core tips with respect to the conducting structure, further coil means adjustably coupled to said output coil means, rectifier means coupled to said further coil means for producing a reference voltage, and means coupled to said load means of said rectifier circuits for producing a direct current voltage varying with the average of the voltages in said first and second pickup coils, said last named means comparing said direct current voltage produced thereby with said reference voltage to provide a control voltage varying with the spacing of said core tips from the conducting structure.

14. Apparatus for positioning a welding element along a seam to be welded in a conducting structure including in combination, means for producing high frequency electrical oscillations including output coil means, first and second coils coupled to said output coil means and having oscillations induced therein, core means movable with respect to said output coil means and said first and second coils for controlling the level of signals in said first and second coils, first and second pickup coil means each having a coil individually coupled to said transducer coils and a core with a tip adjacent the conducting structure, said core tips being in fixed position with respect to the welding element, the oscillations in said pickup coils producing a field about the conducting structure which varies with the position of said core tips with respect to the seam therein to cause the high frequency voltage across said pickup coils to vary, rectifier circuits individually coupled across said pickup coils, said rectifier circuits including load means for producing direct current voltages which vary with respect to each other because of the variation in the high frequency voltages across said pickup coils, said means connecting said load means in opposing relation for producing a first control voltage varying in polarity and in magnitude from zero in accordance with the position of said core tips with respect to the seam in the conducting structure, further coil means adjustably coupled to said output coil means, rectifier means coupled to said further coil means for producing a reference voltage, and means coupled to said load means of said rectifier circuits for producing a direct current voltage varying with the average of the voltages in said first and second coils, said last named means comparing said direct current voltage produced thereby with said reference voltage to provide a second control voltage varying with the spacing of said core tips from the conducting structure, and means responsive to said first and second control voltages for controlling the position of the welding element.

15. Apparatus responsive to the position of an element with respect to a conducting structure having an irregularity therein including in combination, means for producing high frequency electrical oscillations including output coil means, first and second transducer coils coupled to said output coil means and having oscillations induced therein, core means movable with respect to said output coil means and said first and second transducer coils for controlling the level of signals in said first and second coils, first and second pickup coil means each having a coil individually coupled to said transducer coils and a core with a tip adjacent the conducting structure, said core tips being in fixed position with respect to the element, the oscillations in said pickup coils producing a field about the conducting structure which varies with the position of said core tips with respect to the conducting structure to cause the high frequency voltage across said pickup coils to vary, rectifier circuits individually coupled to said pickup coils, said rectifier circuits including load means for producing direct current voltages which vary with respect to each other because of the variation in the high frequency voltages across said pickup coils, and means connecting said load means in opposing relation for producing an output voltage varying in polarity and in magnitude from zero in accordance with the position of said core tips with respect to the irregularity in the conducting structure.

16. Apparatus for positioning an element with respect to a conducting structure having an irregularity therein wherein the element performs an operation on the structure and there is relative movement between the element and the structure, said apparatus including in combination, means for producing high frequency electrical oscillations, first and second transducer coils coupled to said means and having oscillations induced therein, first and second pickup coils in fixed position with respect to the element and adjacent the conducting structure, means coupling said pickup coils individually to said transducer coils, the oscillations in said pickup coils producing a field about the conducting structure which varies with the position of the pickup coils with respect to the conducting structure to cause the high frequency voltage across said pickup coils to vary, rectifier circuits individually coupled across said pickup coils for producing direct current voltages which vary with respect to each other because of the variation in the high frequency voltages across said pickup coils, said rectifier circuits including load means, and means connecting said load means in opposing relation for producing an output voltage across said load means varying in polarity and in magnitude from zero in accordance with the position of said pickup coils with respect to said conducting structure, and means responsive to said direct current control voltage for controlling the angular position of the element during relative movement between the element and the conducting structure.

17. Apparatus for holding an element in a predetermined angular position with respect to an irregular conducting structure during relative movement therebetween including in combination, means for producing high frequency electrical oscillations, first and second transducer coils coupled to said means and having oscillations induced therein, first and second pickup coil means in fixed position with respect to the element and each having a coil with a core having a tip adjacent the conducting structure, with the position of said core tips relative to the conducting structure varying with the angular position of the element with respect to the conducting structure, means connecting said pickup coils individually to said transducer coil with the oscillations in said pickup coils producing a field about the conducting structure which varies with the position of said core tips with respect to the conducting structure to cause the high frequency voltage across said pickup coils to vary, rectifier circuits individually coupled across said pickup coils for producing direct current voltages which vary with respect to each other because of the variation in the high frequency voltages across said pickup coils, said rectifier circuits including load means, means connecting said load means in opposing relation for producing an output voltage varying in polarity and in magnitude from zero in accordance with the position of said core tips with respect to the irregularity of the conducting structure, and means responsive to the output voltage for controlling the angular position of the element during relative movement of the element and the conducting structure.

18. Apparatus for positioning an element with respect to a conducting structure having an irregularity therein including in combination, means for producing high frequency electrical oscillations including output coil means, first and second transducer coils coupled to said output coil means and having oscillations induced therein, core means coupled to said output coil means and said first and second coils, first and second pickup coil means each having a coil individually coupled to one of said transducer coils and a core with a tip adjacent the conducting structure, supporting means for the element and said pickup coil means holding said core tips in fixed position with respect to the element, the oscillations in said pickup coils producing a field about the conducting structure which varies with the position of said core tips with respect to the conducting structure to cause the high frequency voltage across said pickup coils to vary, rectifier circuits individually coupled to said pickup coils, said rectifier circuits including load means for producing direct current voltages which vary with respect to each other because of the variation in the high frequency voltages across said pickup coils, means connecting said load means in opposing relation for producing first balanced control voltages, said core means being movable with respect to said first and second coils to control the signals in said pickup coils so that said first control voltages vary in polarity and in magnitude from zero in accordance with the position of said core tips with respect to the irregularity in the conducting structure, further coil means adjustably coupled to said output coil means, rectifier means coupled to said further coil means for producing a reference voltage, means coupled to said load means of said rectifier circuits for producing a direct current voltage varying with the average of the voltages in said first and second pickup coils, said last named means comparing said direct current voltage produced thereby with said reference voltage to provide a second control voltage varying with the spacing of said core tips from the conducting structure, means responsive to said first control voltage for controlling the angular position of said supporting means to thereby control the angular position of the element with respect to the conducting structure, and means responsive to said second control voltage for controlling the position of said supporting means to thereby control the spacing of said element from the conducting structure.

19. Apparatus for following an irregularity in a conducting structure including in combination, oscillator means for producing high frequency electrical oscillations, pickup means positioned adjacent the conducting structure including a magnetic structure having a pair of pole pieces with spaced pole tips adjacent the conducting structure and a magnetic bridge between said pole pieces, said pickup means including first coil means about both said pole pieces and coupled to said oscillator means to provide oscillations adjacent said conducting structure to produce a field therein, with the field varying with the position of said pole tips with respect to the irregularity, said pickup means including second coil means about said bridge in which a high frequency signal is developed, said signal in said second coil means varying with the field in said conducting structure adjacent said pole tips and thereby varying with the relative position of said pickup means with respect to the irregularity, said oscillator means including winding means providing balanced voltages, a balanced phase detector circuit coupled to said second coil means and to said winding means of said oscillator means, said phase detector circuit producing a direct current control voltage varying in polarity and in magnitude from zero in accordance with the phase of said signal in said second coil means with respect to said oscillations.

20. Apparatus responsive to the spacing of an element from a conductive surface and responsive to the position of the element with respect to an irregularity in the conducting surfaces including in combination, oscillator means for producing high frequency electrical oscillations, coil means in fixed position with the element and including core means having a pair of pole pieces adjacent the conducting surface, means coupling said coil means to said oscillator means to provide oscillations therein which form a field through said pole pieces and adjacent said conducting structure, said coil means including a coil portion in which a high frequency signal is developed which is affected by the field developed in the conducting structure and which varies with the spacing of said pole pieces from the conducting structure and with the position of the pole pieces with respect to the irregularity in the conducting structure, a first rectifier circuit including means providing a reference potential, said first rectifier circuit being coupled to said coil portion and comparing the signal therein with the reference potential to provide a control voltage varying with the spacing of said element from said conducting structure, and a second balanced rectifier circuit including first and second rectifiers coupled to said coil portion and to said oscillator means and producing a second control voltage varying in accordance with the position of said element with respect to said irregularity.

References Cited in the file of this patent

UNITED STATES PATENTS

| | | |
|---|---|---|
| 1,997,272 | Adams | Apr. 9, 1935 |
| 2,557,046 | Evans | June 12, 1951 |
| 2,588,386 | Hubbard et al. | Mar. 11, 1952 |
| 2,670,423 | Darner et al. | Feb. 23, 1954 |